United States Patent [19]
Wang

[11] Patent Number: 5,451,445
[45] Date of Patent: Sep. 19, 1995

[54] FOLDABLE NET ASSEMBLY

[76] Inventor: Tsu J. Wang, No. 33, Lane 287, Sec. 1, Park Rd., Changhua City, Taiwan

[21] Appl. No.: 152,698

[22] Filed: Nov. 16, 1993

[51] Int. Cl.$^6$ ............... A01G 13/00; A01G 13/10
[52] U.S. Cl. ............................ 428/131; 47/20; 47/31; 428/134; 428/137; 428/192; 160/84.01; 160/84.04; 160/84.06
[58] Field of Search ............. 428/131, 192, 99, 134, 428/137; 47/31, 20; 160/84.1 R, 84.1 C, 84.1 E

[56] References Cited

U.S. PATENT DOCUMENTS

| 4,827,957 | 5/1989 | Chang | 47/31 |
| 5,083,396 | 1/1992 | Traut | 47/31 |

FOREIGN PATENT DOCUMENTS

| 1319801 | 6/1987 | Russian Federation | 47/31 |
| 138795 | 5/1930 | Switzerland | 47/31 |

*Primary Examiner*—Nasser Ahmad
*Attorney, Agent, or Firm*—Browdy and Neimark

[57] ABSTRACT

A foldable net assembly is employed as a sunshade in a garden, swimming pool or like places or applied to an outer wall of a building; and also can be mounted to a scaffold at a construction site as a protection screen. The net has an upper lateral rod at one end and a lower lateral rod at the other and is slidably engaged with a plurality of cords tightly extended between an upper supporting rod and a lower supporting rod of a net supporting frame by way of a plurality of fixing clamps and fixing mounts of various kinds. Each fixing clamp and fixing mount are engaged with each other respectively with part of the net sandwiched therebetween. A pull cord engaged with the lower lateral rod of the rod and the upper and lower supporting rods of the supporting frame is used to control the net.

8 Claims, 8 Drawing Sheets

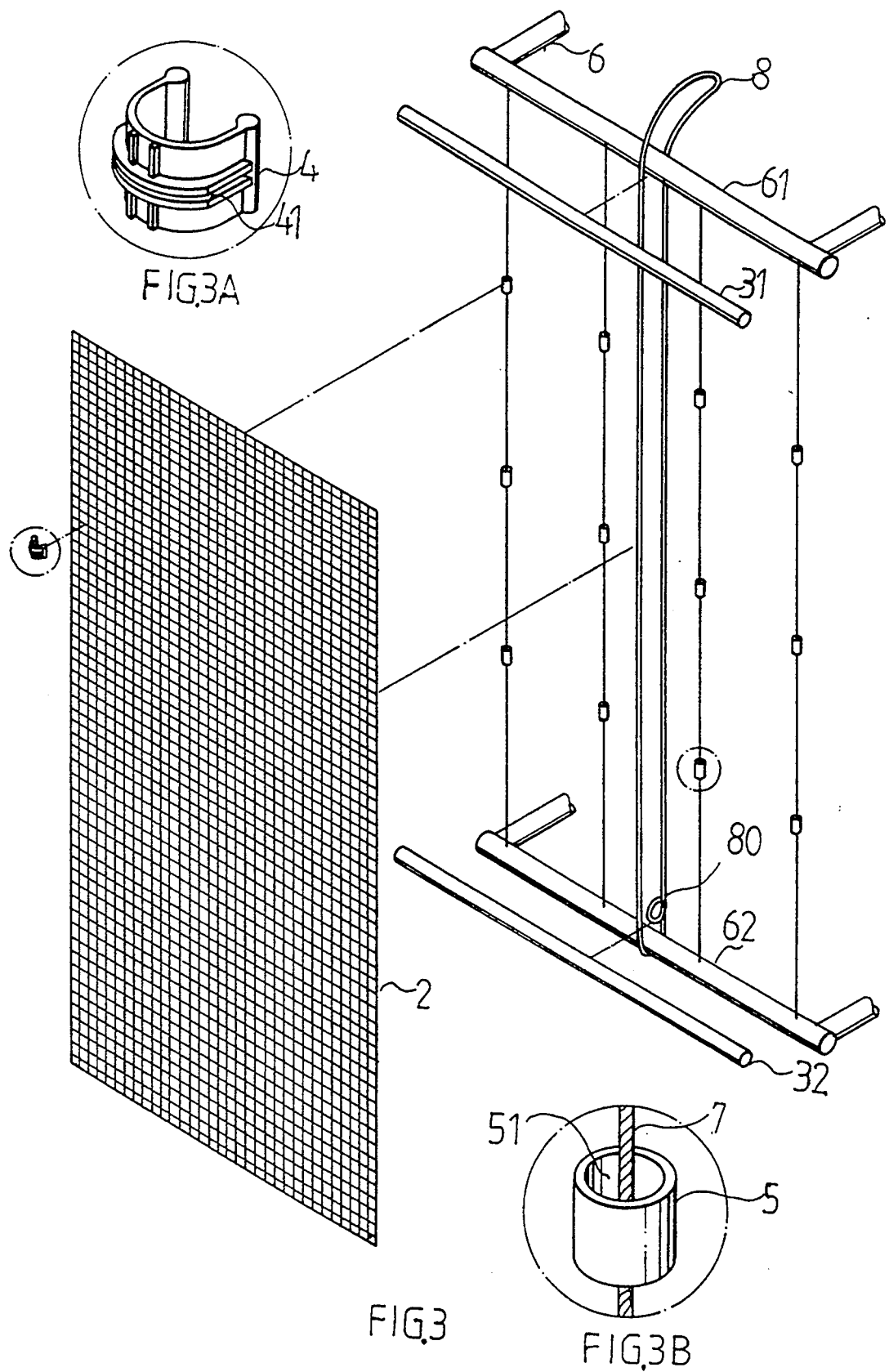

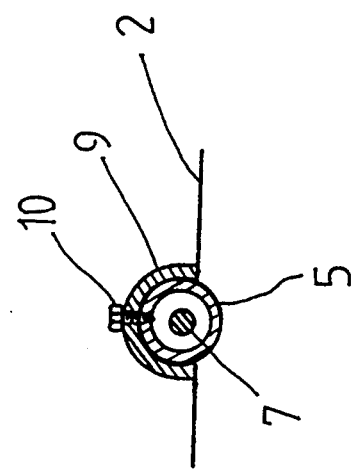
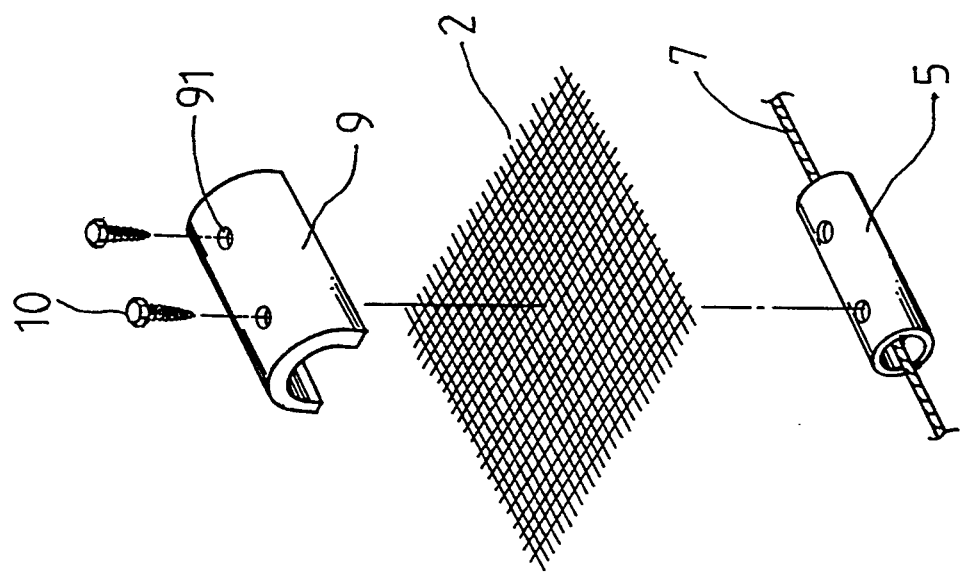

FOLDABLE NET ASSEMBLY

BACKGROUND OF THE INVENTION

The present invention relates to a foldable net assembly which is adapted for use in gardens, fishing ponds, ranches, swimming pool as a sunshade; or for use on an outer wall of a building or on the scaffold at a construction site for safety purpose.

Generally, a net frame applied to a garden as a sunshade is illustrated in FIG. 1. Such net 1 is mounted onto a supporting frame 6 piece by piece. All the net 1 is fixed in place and is not adjustably foldable in accordance to weather conditions or the bitterness of the sun, making the growth of plantation not ideal enough.

Moreover, the heat of the bitter sun will make the room temperature of a building rise to an unbearable degree if no insulation cover is mounted to the outer wall subject to direct heat of the sun in the afternoon of a summer day. So, in consideration of saving energy of an air conditioner in operation, a net is sometimes used to protect a wall of a building from too much heat from the sun.

Furthermore, at a general construction site, nets are mounted to a scaffold by workers for safety purpose so as to prevent falling debrits from hurting people therearound. The mounting or dismounting of the protection nets piece by piece is rather time and labor consuming.

SUMMARY OF THE INVENTION

Therefore, the primary object of the present invention is to provide a foldable net assembly which can be applied to garden plantation as a sunshade.

Another object of the present invention is to provide a foldable net assembly which can be applied to an outer wall of a building as an insulation device.

One further object of the present invention is to provide a foldable net assembly which can be applied to a scaffold at a construction site.

BRIEF DESCRIPTION OF THE DRAWINGS

FIG. 3 is a perspective diagram showing the exploded components of the present invention;

FIG. 3A is an enlarged diagram of the fixing clamp thereof;

FIG. 3B is an enlarged diagram of a fixing tube thereof;

FIG. 5 is a perspective diagram showing the exploded components of the first embodiment thereof;

FIG. 6 is a sectional view of the first embodiment;

DETAILED DESCRIPTION OF THE PREFERRED EMBODIMENT

Figure 1:
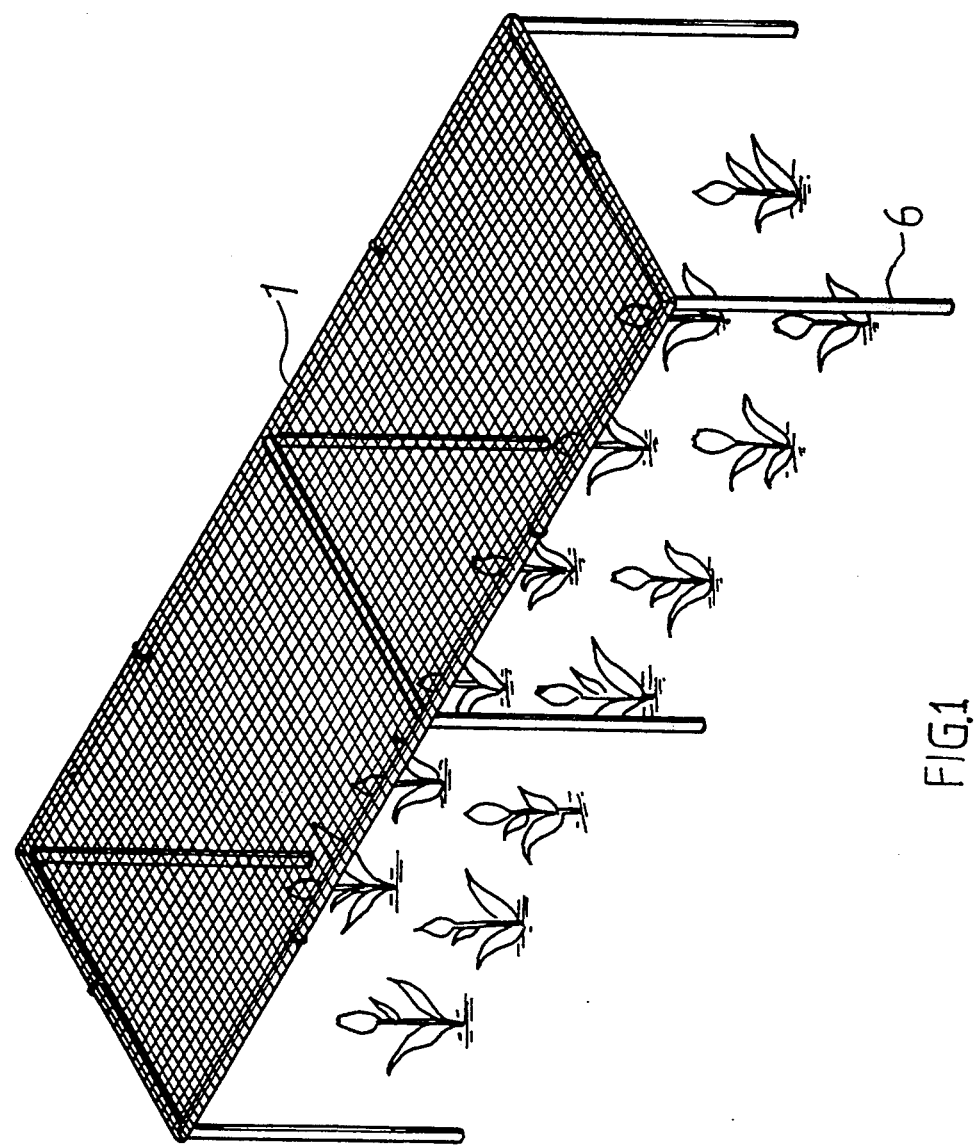
FIG. 1 is a diagram showing a conventional sunshade net mounted onto a supporting frame.
Figures 2, 2A:
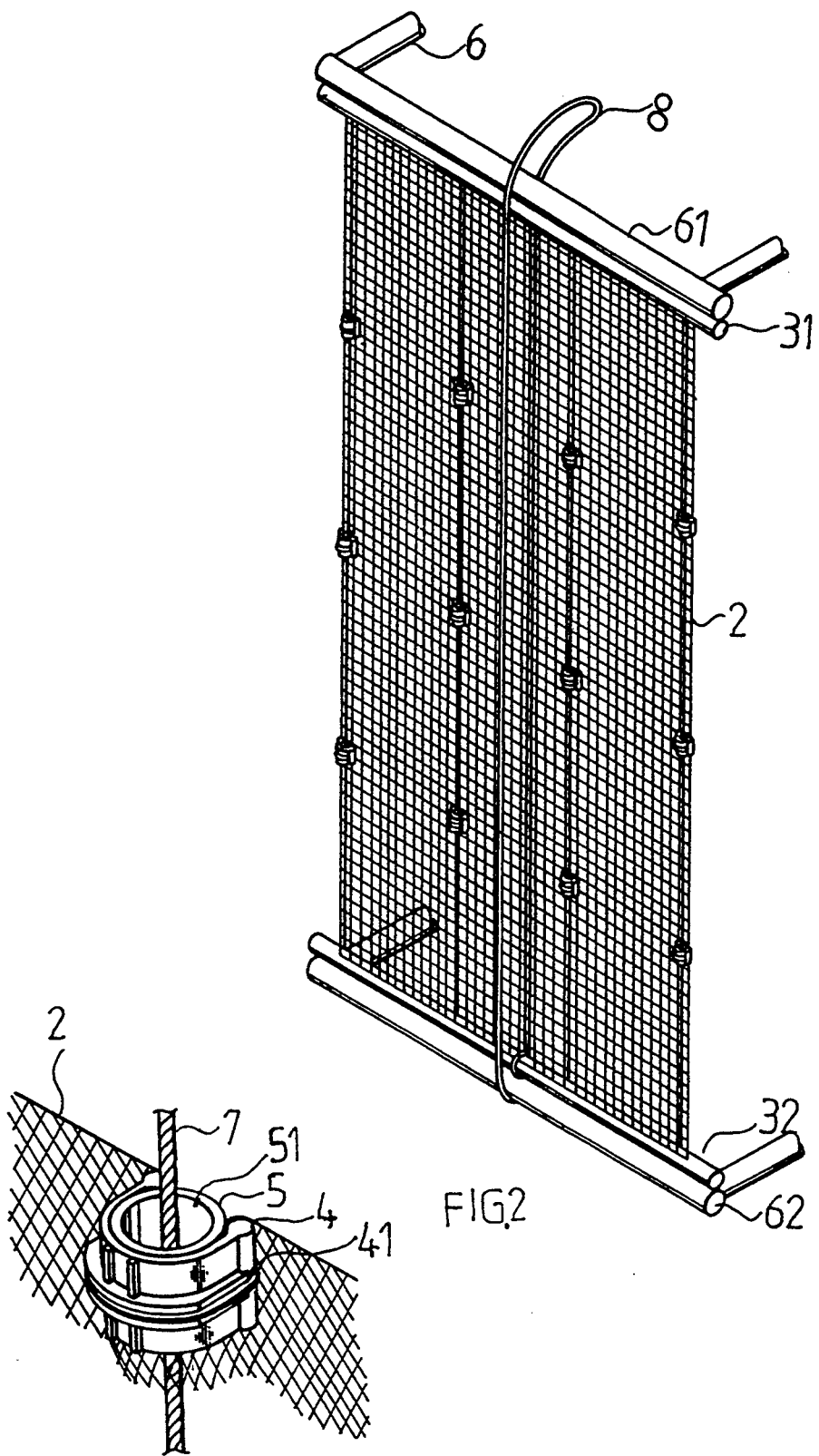
FIG. 2 is a perspective diagram showing the application of the present net frame.
FIG. 2A is an enlarged diagram showing the net fixing means of the present invention.

Referring to FIGS. 2, 3, 3A, 3B, the foldable net assembly of the present invention has a net 2 having a plurality of laterally and longitudinally spaced fixing clamp 4 and a plurality of tubular fixing mounts 5. The fixing clamps 4 are evenly secured to the net 2 in combination with the fixing mounts 5 with the net 2 sandwiched therebetween, and then a wire disposed in the retaining groove 41 of each fixing clamp 4 is led through the net 2 and wound around the tubular fixing mount 5 and then twined to fix in place on the mount 5 so as to make the net 2 and each fixing clamp 4 and a fixing mount 5 tightly fixed together.

To the top edge and the bottom edge of the net 2 is secured a lateral upper rod 31 and a lower rod 32 respectively, the lateral upper rod 31 is connected to an upper supporting rod 61 of a frame 6. A plurality of parallel cords 7 all having one end secured to the upper supporting rod 61 and the other end secured to the lower supporting rod 62 of the frame are led through the through holes 51 of the tubular fixing mounts 5.

Figure 4:
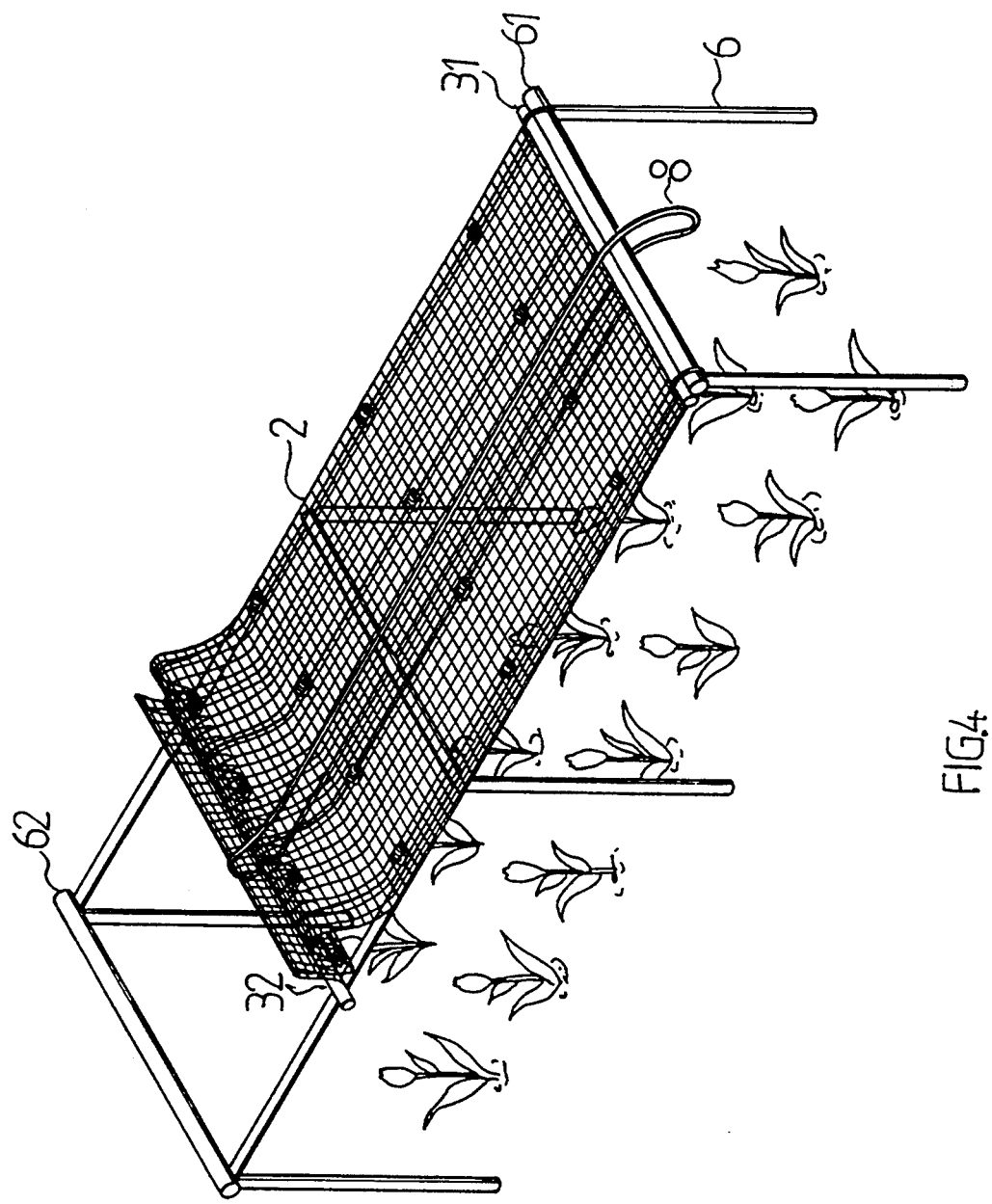
FIG. 4 is a diagram showing the operation of the present invention.

In mounting the net 2 to the frame 6, one end of each cord 7 is secured to the upper supporting rod 61 first and then the other end thereof is led through the through holes 51 of several tubular mounts 5 and finally fixed to the lower supporting rod 62 of the frame 6. The net 2 is next engaged with the cords 7 of the frame 6 by way of the fixing clamps 4 and the fixing tubes 5 in a way as previously described. A pull cord 8 is then looped around the upper and lower supporting rods of the frame 6 and also the net 2 from top to bottom vertically; and adjacent the bottom of such looped pull cord 8 is disposed a circle 80 with which is engaged the lateral lower rod 32 of the net so that the net 2 can be easily pulled up or lowered down along the cords 7 of the frame 6 by actuation of the pull cord 8 in either direction. As shown in FIG. 4, to retain the net 2 firmly in place, the end of the pull cord 8 is tied to the upper supporting rod 61 of the frame 6.

There are various kinds of fixing means including the fixing clamps 4 and the fixing mounts 5 and the net 2, which are described in the subsequent paragraphs.

Referring to FIG. 5, a second embodiment of the present invention is given wherein the fixing clamp 9 is made in a half cut tubular shape and has at least a screw hole 91 disposed thereon so as to permit a screw or screws 10 to be engaged therewith, as shown in FIG. 6. By means of the fixing clamps 9 in engagement with corresponding fixing mounts 5 with the net 2 sandwiched therebetween, the net 2 can be firmly mounted to a frame as previously described.

Figure 8:
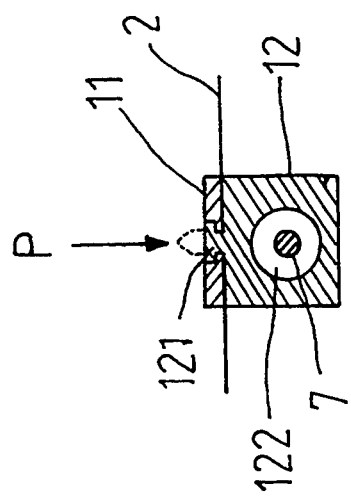
FIG. 8 is a sectional view of the second embodiment.
Figure 7:
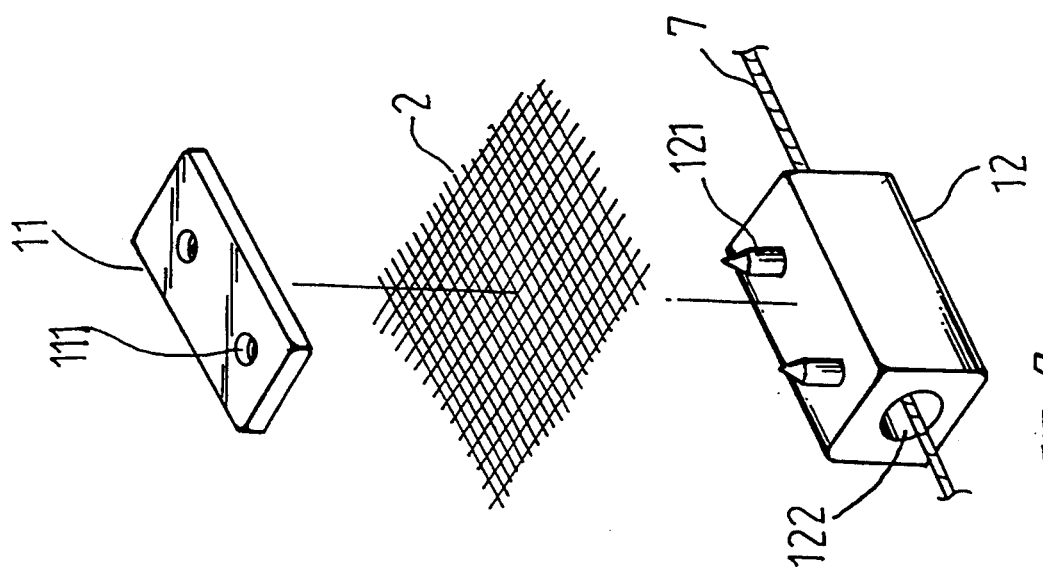
FIG. 7 is a perspective diagram showing the exploded components of the second embodiment.

As further shown in FIGS. 7, 8, the third embodiment of the exploded fixing clamp 11 and the fixing mount 12 are illustrated perspectively. The fixing clamp 11 is a flat board and is provided with a number of holes 111, and a fixing block 12 is engaged with the flat fixing clamp 11. The fixing block 12 has a number of corresponding pointed projections 121 disposed on the top face thereof with which the holes 111 are respectively engaged in assembly with the net 2 sandwiched therebetween. As further shown in FIG. 8, after the assembly, a force P and heat are applied to the pointed projections 121 at the same time so as to make the projections melt in the holes 111 of the flat fixing clamp 11 so that the net 2 can be securedly fixed in place by way of thermal welding.

The fixing block 12 is also equipped with a longitudinal through hole 122 into which a cord 7 is led, as shown in FIG. 7.

Figure 10:
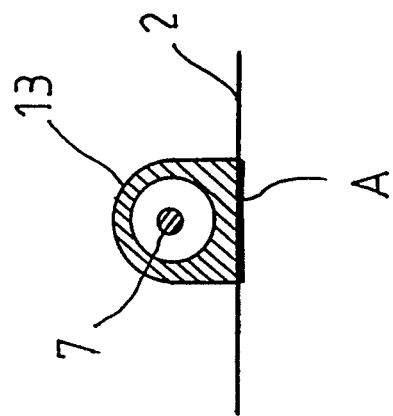
FIG. 10 is a sectional view of the third embodiment.
Figure 9:
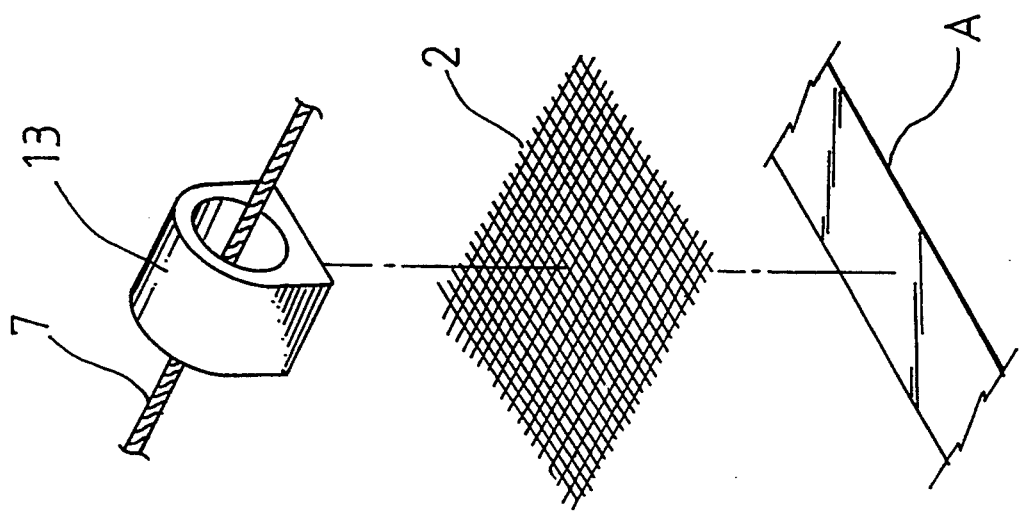
FIG. 9 is a perspective diagram showing the exploded components of a third embodiment.

Referring to FIG. 9, a fourth embodiment of the fixing means of the present invention is illustrated wherein a fixing block 13 having a cord 7 going therethrough; a plastic belt A made of PE or PVC is engaged with the bottom of the fixing block 13 with the net 2 disposed therebetween, and the three are thermally welded together, as shown in FIG. 10.

Figure 12:
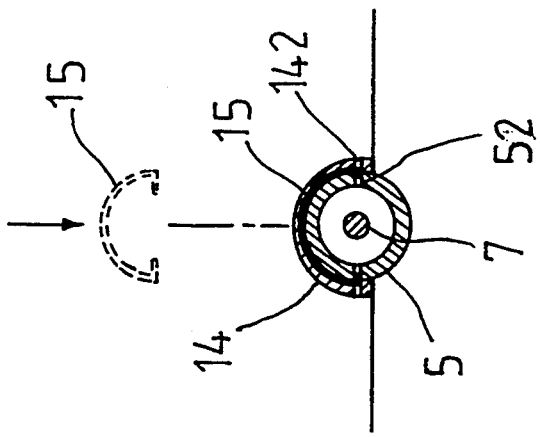
FIG. 12 is a sectional view of the fourth embodiment.
Figure 11:
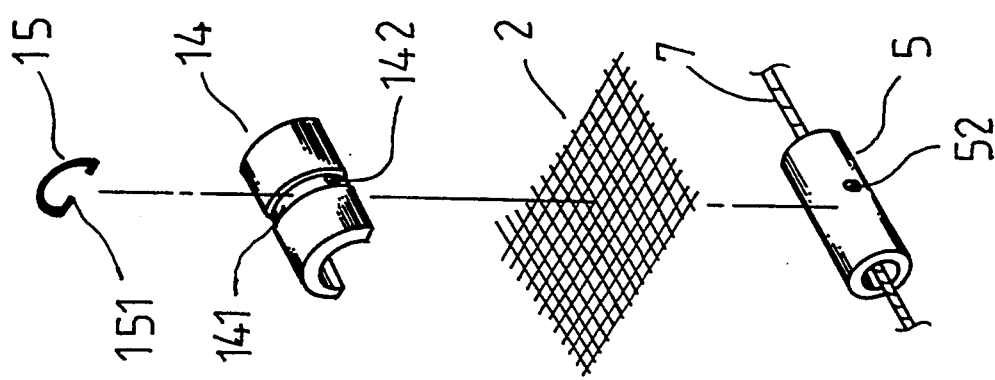
FIG. 11 is a perspective diagram showing the exploded components of a fourth embodiment.

As further shown in FIGS. 11, 12, a fifth embodiment of the fixing means of the present invention is comprised of a semi-tubular fixing clamp 14 having a laterally extended groove 141 having a through hole 142 disposed at each end; a fixing tube 5 having a pair of symmetric holes 52 disposed thereon and a clamp ring 15 having a pair of engagement legs 151 is disposed in the groove 141 and engaged with the holes 52 of the fixing tube 5, with the net sandwiched therebetween, as shown in FIG. 12.

It can be clearly seen that the present net structure facilitates the mounting and dismounting of a net used as a sunshade or protection screen. It can be applied to any places and can be retracted with ease so as to prevent the net from damage by strong wind or bad weather. Easy disposition of the net onto a scaffold at a construction site leads to saving of cost and labor in one aspect and the supporting cords engaged with the net can enforce the same in another aspect.

I claim:

1. A foldable net assembly having an upper supporting rod disposed at an upper end and a lower supporting rod disposed at a lower end and being adapted for use as a sunshade or a protective screen, comprising:
   a unitary flexible net means longitudinally extendable between the upper end and the lower end, the upper and lower ends being secured to laterally positioned upper and lower lateral rods,
   a net supporting frame including three or more immobile and substantially parallel net-supportive slide members disposed generally spaced apart and located between the upper end and the lower end, said slide members being secured across the length of said net means, each of said slide members having one end secured to the upper supporting rod and the other end secured to the lower supporting rod;
   a plurality of laterally spaced net attachments securing in place said flexible net means to said net slide members;
   each one of said net attachments further comprising a fixing clamp and a fixing mount, the fixing clamp and the fixing mount being joined together with said net means sandwiched therebetween by a fastening means, each of the attachments including an aperture containing therethrough a respective one of the slide members, each longitudinal row of attachments having its aperture aligned in a single line;
   each one of said net attachments being slidably mounted by the aperture of the respective one of the slide members; and
   a pull means being looped around the upper and lower supporting rods and engaged to the upper lateral rod for controllably sliding an upper net end of said flexible net means selectively toward and away from the lower end of said net means.

2. The foldable net assembly as claimed in claim 1 wherein said fixing clamp is of a semi-tubular shape having a semi-circular groove on the outer wall thereof; and said fixing mount is of a tubular shape; said fixing clamp and said fixing mount are engaged with each other with part of said net means sandwiched therebetween and a wire means is disposed in said semi-circular groove and wound around said fixing means so as to lock the same to said net means.

3. The foldable net assembly as claimed in claim 1 wherein said fixing clamp is of a semi-tubular shape having a number of screw holes disposed thereon and said fixing mount is of a tubular form and has a number of corresponding holes defined thereon so as to permit said fixing clamp and said fixing mount to be engaged with each other by screw means with part of said net means sandwiched therebetween.

4. The foldable net assembly as claimed in claim 1 wherein each said fixing clamp is a flat board having a couple of holes disposed thereon and said fixing mount having a couple of corresponding projections defined thereon; said fixing mount is a of a parallelepiped shape having a longitudinal through hole defined thereon so as to permit said fixing mount to be slidably engaged with said side members of said net supporting frame; said fixing clamp board is engaged with said fixing mount with part of said net means sandwiched therebetween and the projections led through said through holes and force and heat are applied to the end of said projections so as to make the same thermally welded, permitting the fixing clamp board and the fixing mount integrally fixed together.

5. The foldable net assembly as claimed in claim 1 wherein said fixing clamp is a belt made of polyethylene or polyvinylchloride plastic material and is engaged with the bottom of the fixing mount having a tubular shape with part of said net means sandwiched therebetween by way of thermal welding.

6. The foldable net assembly as claimed in claim 1 wherein said fixing clamp has a concave groove on the outer wall thereof with a hole disposed at each end thereof; a clamp ring having a leg at each end thereof; and a tubular fixing mount having a pair of corresponding holes disposed thereon for engagement with said legs of said clamp ring is slidably engaged with the slide member; said fixing clamp and said fixing mount is engaged with each other by said clamp ring with part of said net means sandwiched therebetween.

7. The foldable net assembly as claimed in claim 1 wherein said pull means includes a cord in a loop form with one end in engagement with the upper supporting rod of said net supporting frame and the other end in engagement with the lower supporting rod; a circle is formed adjacent the bottom of the looped cord so as to permit said lower lateral rod to go therethrough such that the pull in either direction at one end of said cord can make said net means move upward or downward.

8. The foldable net assembly according to claim 1, wherein:
   the slide members further comprise flaccid lines, the lines being stretched between the upper supporting rod and the lower supporting rod and having respective line ends attached to the upper supporting rod and the lower supporting rod; and
   said net means includes an upper lateral rod and a lower lateral rod, said lower lateral rod being movable by said pull means.

* * * * *